(12) United States Patent
Maaradji et al.

(10) Patent No.: US 9,424,688 B2
(45) Date of Patent: Aug. 23, 2016

(54) METHOD FOR DISPLAYING A VIRTUAL WORLD IN WHICH THE AVATAR OF A USER OF A VIRTUAL-REALITY SERVICE EVOLVES

(75) Inventors: Abderrahmane Maaradji, Nozay (FR); Abdelkrim Hebbar, Nozay (FR); Hakim Hacid, Palaiseau (FR)

(73) Assignee: Alcatel Lucent, Boulogne-Billancourt (FR)

( * ) Notice: Subject to any disclaimer, the term of this patent is extended or adjusted under 35 U.S.C. 154(b) by 217 days.

(21) Appl. No.: 13/805,589

(22) PCT Filed: Jun. 28, 2011

(86) PCT No.: PCT/EP2011/060843
§ 371 (c)(1),
(2), (4) Date: Mar. 11, 2013

(87) PCT Pub. No.: WO2012/001006
PCT Pub. Date: Jan. 5, 2012

(65) Prior Publication Data
US 2013/0162677 A1    Jun. 27, 2013

(30) Foreign Application Priority Data
Jun. 29, 2010  (FR) ..................... 10 02712

(51) Int. Cl.
*G06T 19/00*  (2011.01)
*G06F 3/01*  (2006.01)
*G06F 9/44*  (2006.01)
*A63F 13/30*  (2014.01)
*G06N 3/00*  (2006.01)
*G06Q 90/00*  (2006.01)

(52) U.S. Cl.
CPC ............... *G06T 19/006* (2013.01); *A63F 13/12* (2013.01); *G06F 3/011* (2013.01); *G06N 3/006* (2013.01); *G06Q 90/00* (2013.01); *A63F 2300/556* (2013.01); *A63F 2300/6615* (2013.01); *A63F 2300/8082* (2013.01)

(58) Field of Classification Search
CPC ......... G06T 19/006; G06F 3/011; G06F 8/34; G06N 3/08; A63F 13/12
USPC ....................... 345/633; 706/45; 715/757–772
See application file for complete search history.

(56) References Cited

U.S. PATENT DOCUMENTS

| | | | |
|---|---|---|---|
| 2009/0094518 A1* | 4/2009 | Lawther | G06F 3/04817 715/716 |
| 2009/0144267 A1 | 6/2009 | Cook et al. | |
| 2009/0210812 A1 | 8/2009 | Cragun et al. | |

(Continued)

OTHER PUBLICATIONS

International Search Report for PCT/EP2011/060843 dated Jul. 22, 2011.

*Primary Examiner* — Matthew Salvucci
(74) *Attorney, Agent, or Firm* — Fay Sharpe LLP

(57) ABSTRACT

The invention pertains to a method for displaying a virtual world in which the avatar of a user of a virtual reality service evolves, said method being operative to use a standard mode for displaying said virtual world, to identify objects visible to the avatar within the displayed virtual world, and, for at least one of said identified objects, to determine whether a relationship exists within the virtual reality service's social network between said object and the user, and if so, to determine a display mode to apply to said object depending on said relationship, the display of said object being altered by applying said determined mood.

11 Claims, 1 Drawing Sheet

(56) References Cited

U.S. PATENT DOCUMENTS

| | | |
|---|---|---|
| 2009/0254358 A1 | 10/2009 | Li et al. |
| 2010/0023879 A1 | 1/2010 | Finn et al. |
| 2010/0275136 A1* | 10/2010 | Gower .......................... 715/757 |
| 2011/0289443 A1* | 11/2011 | Heaven et al. ................. 715/772 |

* cited by examiner

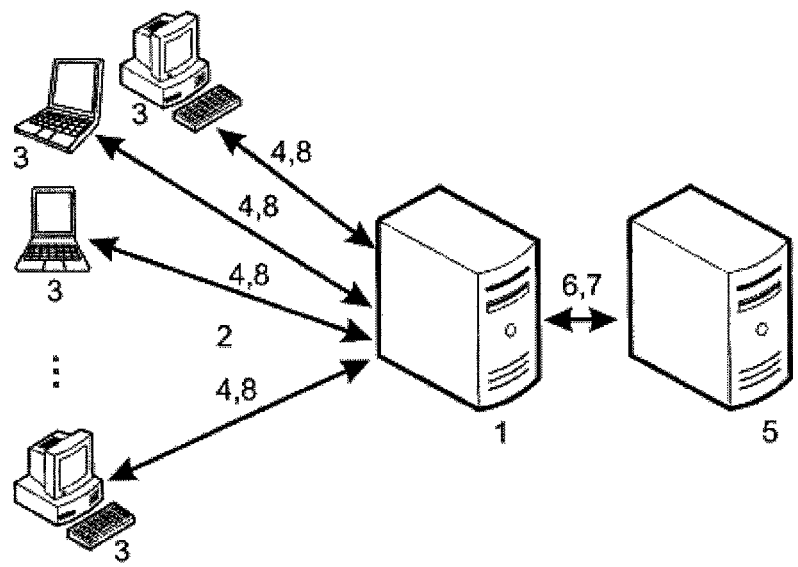

METHOD FOR DISPLAYING A VIRTUAL WORLD IN WHICH THE AVATAR OF A USER OF A VIRTUAL-REALITY SERVICE EVOLVES

The invention pertains to a method for displaying a virtual world in which the avatar of a user of a virtual-reality service evolves, as well as a virtual-reality service comprising means for displaying, in a standard mode, a virtual world in which said avatar evolves and means for implementing such a method.

Virtual-reality services such as SecondLife® provide their users with a computer-simulated virtual world in which said users can interact with elements of said virtual world by means of a terminal, for example a desktop or laptop computer, a personal digital assistant (PDA), or a smartphone such as the iPhone® from Apple®.

In particular, virtual reality services offer their users many opportunities for experiences, particularly, to a certain extent, the experience of telepresence. The work "Communication in the Age of Virtual Reality" (F. BIOCCA, M. R. LEVY, Lawrence Erlbaum Associates, ISBN 0805815503, 1995) gives a detailed description of the definitions and possibilities that pertain to virtual reality services.

Furthermore, virtual reality services have applications in increasingly numerous and varied fields, particularly e-commerce, education, business training, fiction, and even research.

With the democratization of the Internet, the popularity of virtual reality services is exponentially increasing. According to the article available at the address http://www.businesswire.com/news/google/20070424006287/en, by the end of 2011, 80% of Internet users will be users of a virtual-reality service.

This great popularity is partially explained by how simple it is to access a virtual-reality service. Any user can locally register for such a service from a terminal by creating an avatar to represent him or her in the virtual world provided by said service, then connect to said service by launching a browser or a client application installed on said terminal in order to display on the screen of said terminal the zones of said virtual worlds in which the avatar of said user is located.

Once registered and connected to such a service, the user can have his or her avatar interact with the avatars of other users of said service and with different virtual objects located in the same zones as said avatar. The virtual objects are three-dimensional representations of objects from everyday life, such as houses, trees, services, and tables. In particular, the user may acquire virtual objects in order to use them, for example so that the avatar can live there in the case of houses, or to share them with other users.

In order to facilitate the immersion of users in their virtual worlds, one of the main goals of virtual-reality service providers is to make said worlds as realistic as possible. In particular, the suppliers of current virtual reality services focus their efforts on the display quality, particularly the resolution, of their virtual worlds and the elements, particularly virtual objects, that they contain.

Normally, the display quality of a virtual object is affected by the quantity of details, and therefore information, that are used to model said object. Additionally, for a given user, most current virtual-reality services model with as much detail as possible the elements present within the zones where the avatar of said user is located, for the purpose of displaying in as detailed the way as possible the zones in which said avatar evolves, and thereby to improve the feeling of realism for the user of said avatar.

This principle of modeling and displaying is mainly based on calculating the distance between the current location of the avatar of the relevant user and the rest of the elements present in the relevant zone of the virtual world.

However, the modeling operation that is performed is burdensome, requiring a great deal of computing resources, and requires even more when the virtual world to be modeled is accessible from a network.

A great deal of work has been carried out to improve the modeling of virtual worlds. In particular, many virtual-reality services use streaming display techniques for their virtual worlds. The document "A Framework for Quality Adaptive Media Streaming" (Ch. C. KRASIC, thesis for the Doctor of Philosophy degree, OGI School of Science and Engineering at Oregon Health & Science University, 2004) explains in detail the principles of such a technique.

Furthermore, this principle of modeling and displaying virtual objects are not entirely satisfactory with respect to realism and immersion, in that it does not take into account some underlying principles of human psychology, particularly principles of human perception.

This is because it is largely their ability to interpret and reproduce to the greatest extent possible the senses and social experience of human beings that gives the virtual worlds their realism and helps improve the immersion of the users within said world.

In particular, it is well-known that a user surrounded by people and/or objects focuses even more attention on the people that he or she knows and/or on the objects that are familiar to him or her, rather than on all of said people and/or said objects.

Human perception comprises the steps of a user visualizing given objects, recognizing said objects, and distinguishing the shapes of said objects. In particular, human perception takes into account the fact that the user distinguishes among the objects that he or she sees those which belong to him or her and/or those which are somewhat familiar to him or her. For example, whenever a user enters a parking lot, he or she focuses his or her closest attention on his or her car and/or on those of the people he or she knows.

In virtual worlds, the users have their avatars interact with those of other users, have their avatars evolve in different zones, and may also acquire virtual objects. These activities may particularly enable them to create social relations, even friendships, with other users who share, for example, the same centers of interest, thereby building a virtual social network.

Whenever a large number of users connected to a virtual-reality service and who have virtual objects located within the same zone of the virtual world provided by said service, for example in order to visit a museum, or to attend a concert or any gathering whatsoever, it is difficult for a given user to distinguish, among all the virtual objects displayed at the same time on his or her terminal, those that belong to him or her and/or those that belong to his or her contacts within the virtual world.

The invention aims to improve upon the prior art, particularly by disclosing a method for displaying a virtual world that enables the user to recognize and easily distinguish his or her own virtual objects and/or those of his or her contacts within said service, all while optimizing the necessary computing resources.

To that end, according to a first aspect, the invention discloses a method for displaying a virtual world in which the avatar of a user of a virtual reality service evolves, said method being operative to use a standard mode for displaying said virtual world, to identify objects visible to the avatar within the displayed virtual world, and, for at least one of said identified objects, to determine whether a relationship exists within the virtual reality service's social network between said object and the user, and if so, to determine a display mode to apply to said object depending on said relationship, the display of said object being altered by applying said determined mode.

According to a second aspect, the invention discloses a server that delivers a virtual-reality service, said server comprising means for displaying, within a standard mode, a virtual world in which the avatar of a user of said service evolves, said server further comprising:

means for identifying objects visible to the avatar within the displayed virtual world;

means for determining the existence of a relationship within said service's social network between said identified objects and the user;

means for determining a display mode to apply to said objects depending oh said relationship;

means for altering the display of said objects by applying said determined mood.

According to a third aspect, the invention discloses a server for a virtual reality service, said server comprising an application comprising:

means for determining the existence of a relationship within the social network of said service between identified objects and a user; and means for determining a display mode to apply to said objects.

Other features and advantages of the invention will become apparent in the following description, made with reference to the attached FIGURE depicting an architecture for providing users with a virtual-reality service according to one embodiment of the invention.

With respect to that FIGURE, a method for displaying a virtual world in which the avatar of a user of a virtual reality service evolves is described below. The virtual reality service is particularly delivered by a server 1 within a network 22 users connected to said service by means of their terminal 3, said terminal potentially being, for example, a desktop or laptop computer, a personal digital assistant, or a smartphone.

The server 1 may comprise means capable of executing an algorithm to implement the method for displaying the virtual world on the terminal 3 of a user, particularly when said user connects to the virtual reality service by means of said terminal.

When the user connects to the virtual reality service, the method is operative to use a standard mode for displaying the virtual world in which said user's avatar evolves, said virtual world being displayed on the terminal 3 of said user. To do so, the server 1 comprises means for displaying the virtual world in a standard mode. In the standard display mode, the entire virtual world is displayed uniformly, meaning that the objects of said world and the avatars that evolve within said world are displayed the same way, particularly with the same display quality.

According to one embodiment, the display method according to the invention may be an option of the virtual reality service that the user can turn on, for example once he or she is connected to said service and the virtual world in which his or her avatar evolves is displayed in a standard mode on his or her terminal 3, or by editing his or her settings for using said service so that said option is turned on automatically when he or she connects to said service.

With respect to the FIGURE, when this option is turned on, the user sends a request 4 by means of his or her terminal 3 to the server 1 delivering the virtual reality service, said server then continuing the implementation of the method.

The method is then operative to identify objects visible to the user's avatar within the displayed virtual world. To do so, the server 1 comprises means for identifying objects visible to the user, for example objects displayed on the terminal 3 of said avatar's user, or even objects closer to said avatar from among said displayed objects.

In particular, the means of identification may be capable of computing, for each displayed object, the distance between the avatar's current position within the displayed virtual world and said object, said object then being identified by said means if the computed distance is small enough.

The method is additionally operative, for at least one of the identified objects, to determine whether a relationship exists within the virtual reality service's social network between said object and the user. In particular, the method may be operative to determine whether a relationship exists between each of the user's identified objects.

To do so, the server 1 may comprise means for determining the existence of a relationship within the social network of said service between the identified objects and the user.

In particular, the relationship between an identified object and the user may pertain to the relationship within the social network between said user and said object's owner; the means for determining the existence of a relationship are in such a case capable of determining whether a relationship exists within the social network between said owner and said user.

The relationship between the user and an owner of an identified object may pertain to the existing social proximity between said user and said owner within the social network. For example, the owner of the identified object may be a direct contact of the user within the social network, such as a friend of said user, or an indirect contact, such as a friend of a contact of said user. Furthermore, the user may himself or herself be the owner of one of the identified objects.

If there is a relationship within the social network between an identified object and the user, the method is operative to determine a display mode to apply to said object depending on said relationship, the display of said object in such a case being altered by applying said determined mode.

To do so, the server 1 may comprise means for determining a display mode to apply to objects depending on their relationship with the user and means for altering the display of said objects by applying said determined mode.

According to one depicted embodiment, an outside server 5 may be implemented within the preexisting architecture for providing the virtual reality service, and may comprise an application comprising:

means for determining the existence of a relationship within said service's social network between the identified objects and the user; and means for determining a display mode to apply to said objects.

With respect to the FIGURE, the server 1 may comprise means for sending to the server 5, for each identified object, a request 6 in order to obtain the display mode to be applied to said object depending on its relationship with the user.

Additionally, the server 5 may comprise means for sending a notification 7 to the server 1 in response to each request 6 that is sent, said notification comprising the display mode determined by the application for the corresponding identified object.

According to another embodiment that is not depicted, the aforementioned application may be incorporated into the server 1 that provides the virtual reality service.

According to one embodiment, the method is operative to alter the display quality of an object depending on the determined relationship between said object and the user. For example, the server's 1 means for altering may be capable of altering the resolution of an identified object, or the quantity of said object's details, or the sharpness of said object, depending on the relationship between said object and the user.

In particular, the an object's display quality may be altered so as to improve the user's visual perception of said object depending on the degree of the relationship between said object and said user.

The degree of the relationship between an identified object and the user may, in particular, be linked to the level of social proximity between said user and the owner of said object, the means for determining the existence of a relationship being capable of determining said degree depending on said level, particularly along a predefined scale.

To do so, the means for determining the existence of a relationship may be capable of querying a database of the virtual reality service's social network in order to determine the degree of the relationship between an identified object and the user along a predefined scale.

According to one embodiment, the external server 5 may comprise a database within which the existing relationships between the different users of the virtual reality service are saved, the means for determining the existence of a relationship being capable of querying said base.

For example, if the owner of an identified object is an indirect contact of the user within the virtual reality service's social network, the degree of the relationship between said object and said user shall be medium.

Likewise, if the owner of an identified object is a direct contact of the user within the virtual reality service's social network, the degree of the relationship between said object and said user shall be high.

Additionally, if the owner of an identified object is the user himself or herself, the degree of the relationship between said object and the user will be very high.

Finally, if there is no relationship between the owner of the identified object and the user within the virtual reality service's social network, or if that relationship is too distant, the means for determining the existence of a relationship may be capable of determining that there is no relationship between said object and the user, and the method will not alter the display of said object.

Depending on the degree of the relationship between an object and the user, the means for determining a display mode are capable of determining the appropriate display mode to apply to said object in order to improve the user's visual perception of said object.

In particular, the display mode may be determined in such a way as to improve the display quality of an object in proportion to the degree of the relationship between said object and the user. Furthermore, display modes that each correspond to a degree of relationship between an object and the user may be predefined within the virtual reality service, the means for determining a display mode being capable of selecting one of said predefined modes as the display mode to apply to an object depending on the degree of its relationship with the user.

For example, if the degree of the relationship between an object and the user is very high, for example because the user is the owner of said object, the display mode to apply to said object will be the one that corresponds to the best display quality.

Likewise, if the degree of the relationship between an object and the user is high, for example because the owner of said object is a direct contact of said user, the display mode to apply to said object will be the one that corresponds to a good display quality.

Furthermore, if the degree of the relationship between an object and the user is medium, for example because the owner of said object is an indirect object of said user, the display mode to apply to said object will be the one that corresponds to a medium display quality.

Finally, if there is no relationship between an object and the user, or if the degree of said relationship is too low, the method will not alter the display of said object.

This way, the display method makes it possible, thanks to a technology based on adaptive streaming display, to improve the realism of the virtual world by imitating one of the primary mechanisms of human perception. By positively altering the display quality of the objects that are visible to the user's avatar and familiar to said user, the method enables said user to more easily spot said objects from among other, unfamiliar objects, said other objects being displayed in a basic-quality standard mode.

With respect to the FIGURE, after the server 1 receives a notification 7 comprising the display mode to apply to an object, the means for altering the display send a notification 8 to the terminal 3 of the user in order for said terminal's display means apply said mode to said object in order to alter the display of said object depending on its relationship with the user.

According to another embodiment, the method may be operative to alter the display quality of an object in a manner inversely proportional to the degree of its relationship with the user. For example, the predefined display modes may relate to an object's level of blur, said level of blur being inversely proportional to the degree of the relationship between said object and the user.

In particular, the virtual reality service may comprise a predefined scale for determining the degree of a relationship, the lowest level of said scale corresponding to the situation in which there is no relationship within said service's social network and the owner of an identified object, or the situation in which the relationship between said user and the owner of said object is too distant.

The invention claimed is:

1. A method for displaying a virtual world in which the avatar of a user of a virtual reality service evolves, said method being operative
   to use a standard mode for displaying said virtual world,
   to identify objects visible to the avatar within the displayed virtual world, and,
   for at least one of said identified objects, to determine whether a relationship exists within the virtual reality service's social network between an owner of said object within the virtual world and the user, wherein the objects are distinct from the avatar,
   if the relationship exists and an owner of the object within the virtual world is a direct contact of the user in the virtual reality service's social network, to determine a second display mode to apply to said object depending on said relationship wherein the second display mode is different from the standard display mode, and
   if the relationship exists and the owner of the object is an indirect contact of the user in the virtual reality service's social network, to determine a third display mode different from the standard and second display modes to apply to said object, the display of said object within the virtual world being altered by applying either one of said determined second and third display modes, wherein a resolution used in the standard display mode is lower than a resolution used in the second and third display modes, wherein the resolution of the second display mode is higher than the resolution of the third display mode, wherein an owner of said object is an avatar within the virtual world distinct from a creator of said object and the user, and wherein the indirect contact is a contact of the direct contact in the virtual reality's social network.

2. A display method according to claim 1, wherein it is operative to determine whether a relationship exists between each of the identified objects and the user, so as to alter the display of each of said objects by applying to it either one of the second and third display modes.

3. A display method according to claim 1, wherein it is operative to alter the display quality of the object depending on the determined relationship.

4. A display method according to claim 3, wherein the object's display quality is altered to improve the user's visual perception of said object depending on the degree of the relationship between said object and said user.

5. The server according to claim 3, wherein the object's display quality is altered to negatively impact the user's visual perception of said object depending on the degree of the relationship between said object and said user.

6. A server delivering a virtual reality service, said service displaying, in a standard mode, a virtual world in which the avatar of a user of said service evolves, said server additionally comprising:
an identifier configured to identify objects visible to the avatar within the displayed virtual world;
a relationship determination component configured to determine the existence of a relationship within said service's social network between owners of said identified objects within the displayed virtual world and the user, wherein the objects are distinct from the avatar;
a display mode determination component configured to:
determine a second display mode to apply to said objects if the relationship exists and an owner of the said objects is a direct contact of the user within the virtual reality service's social network, wherein the second display mode is different from the standard display mode, and determine a third display mode to apply to said objects if the relationship exists and an owner of said objects is an indirect contact of the user within the virtual reality service's social network, wherein the third display mode is different from the second and standard display modes; and
an alteration component configured to alter the display of said objects by applying said determined mode, wherein respective resolutions of the second and third display modes are higher than the resolution used in the standard display mode, wherein the resolution of the second display mode is higher than the resolution used in the third display mode, and wherein an owner of said object is an avatar within the virtual world distinct from a creator of said object and the user, and wherein the indirect contact is a contact of the direct contact in the virtual reality's social network.

7. The server according to claim 6, wherein the alteration component is configured to alter the display quality of objects depending on the determined relationship.

8. The server according to claim 7, wherein the alteration component is configured to positively alter the display quality of objects and negatively alter the display quality of objects corresponding to a level of social proximity between the owners of said objects and the user.

9. A server for a virtual reality service, said server comprising an application, the application comprising:
a relationship determination component configured to determine the existence of a relationship within a social network of said service between an owner of at least one identified object and a user, wherein the owner of said at least one identified object is an avatar within the virtual world distinct from the user and a creator of said at least one identified object, said at least one identified object being distinct from the avatar: and
a display determination component configured to:
determine a second display mode to apply to said at least one object displayed in a standard display mode if the relationship exists and an owner of the objects is a direct contact of the user in the social network of said service,
determine a third display mode different from the standard display mode and the second display mode to apply to said at least one object displayed in a standard display mode if the relationship exists and the owner of the objects is an indirect contact of the user in the social network of said service, wherein the indirect contact is a contact of the direct contact in the virtual reality's social network,
wherein a resolution used in the second display mode and a resolution used in the third display mode are higher than a resolution used in the standard display mode, and
wherein the resolution of the second display mode is higher than the resolution of the third display mode.

10. The server according to claim 9, wherein the display determination component is configured to alter a display quality of the at least one object corresponding to a degree of the relationship between the owner of the at least one object and the user.

11. The server according to claim 10, wherein the display determination component is configured to alter the display quality of the at least one object inversely proportional to the degree of the relationship between the owner of the at least one object and the user.

* * * * *